(12) United States Patent
Barber et al.

(10) Patent No.: US 9,081,722 B2
(45) Date of Patent: Jul. 14, 2015

(54) SYSTEMS AND METHODS FOR IMPROVING PERFORMANCE OF REMOTE USB STORAGE

(71) Applicant: VMware, Inc., Palo Alto, CA (US)

(72) Inventors: Peter Barber, Stevenage (GB); Aaron Rolett, Palo Alto, CA (US); Reilly Grant, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 44 days.

(21) Appl. No.: 13/711,321

(22) Filed: Dec. 11, 2012

(65) Prior Publication Data

US 2014/0164648 A1    Jun. 12, 2014

(51) Int. Cl.
*G06F 3/00*    (2006.01)
*G06F 13/12*    (2006.01)
*G06F 3/06*    (2006.01)

(52) U.S. Cl.
CPC ............ *G06F 13/122* (2013.01); *G06F 3/0611* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 7,197,638 | B1 * | 3/2007 | Grawrock et al. | 713/165 |
| 7,640,378 | B2 * | 12/2009 | McLeod | 710/29 |
| 8,549,184 | B2 * | 10/2013 | Tang et al. | 710/5 |
| 2010/0169071 | A1 * | 7/2010 | Oltuszyk et al. | 703/24 |
| 2013/0132620 | A1 * | 5/2013 | de Goede | 710/53 |
| 2013/0132960 | A1 * | 5/2013 | de Goede | 718/101 |

* cited by examiner

*Primary Examiner* — Idriss N Alrobaye
*Assistant Examiner* — Richard B Franklin

(57) ABSTRACT

Methods and systems described herein facilitate improving universal serial bus (USB) storage performance in remote computing environments. A virtual USB host is associated with a virtual machine running a guest operating system (OS) and is configured to communicate with a USB storage device that is connected to a remote terminal. The virtual USB host is further configured to transmit one of a data-in request to the USB storage device before the guest OS transmits the data-in request or an acknowledgement of a data-out request to the guest OS before the USB storage device transmits the acknowledgement.

20 Claims, 4 Drawing Sheets

SYSTEMS AND METHODS FOR IMPROVING PERFORMANCE OF REMOTE USB STORAGE

BACKGROUND

Virtual Desktop Infrastructure (VDI) refers to a system of providing complete centrally-managed desktops to users using computer virtualization technology. VDI is used to create a large number of independent computing environments for a large number of users. In VDI, each desktop is exported to the user from a virtual machine (VM) that is assigned to the user. The user interacts with the desktop using a remote terminal, which may have its own resources such as compute resources, memory, network, and storage. The remote terminal may include a Universal Serial Bus (USB) host for USB storage devices connected by the user. The USB host the device is connected to is therefore separated from the USB device driver within the VM by a virtualization layer and a remoting layer. The additional latency introduced between the USB device and the USB device driver results in lower performance due to the synchronous nature of USB data transfers. This issue is especially severe for USB storage devices because each operation consists of multiple requests, which are submitted serially by the USB device driver.

As each request requires a round-trip between the USB device and the USB device driver before the next request is submitted, the total latency may be three times the round-trip latency of the data pathway. When a connection over a high-latency network, such as the Internet, is involved, a latency of 100 ms is multiplied to at least 300 ms for each operation. The throughput to and from the USB device is therefore reduced substantially. Accordingly, the throughput to and from the USB device is therefore reduced substantially, impacting user experience.

SUMMARY

Methods and systems described herein facilitate improving universal serial bus (USB) storage performance in remote computing environments. A virtual USB host is associated with a virtual machine running a guest operating system (OS) and is configured to communicate with a USB storage device that is connected to a remote terminal. The virtual USB host is further configured to transmit one of a data-in request to the USB storage device before the guest OS transmits the data-in request or an acknowledgement of a data-out request to the guest OS before the USB storage device transmits the acknowledgement.

DETAILED DESCRIPTION

Figure 1:
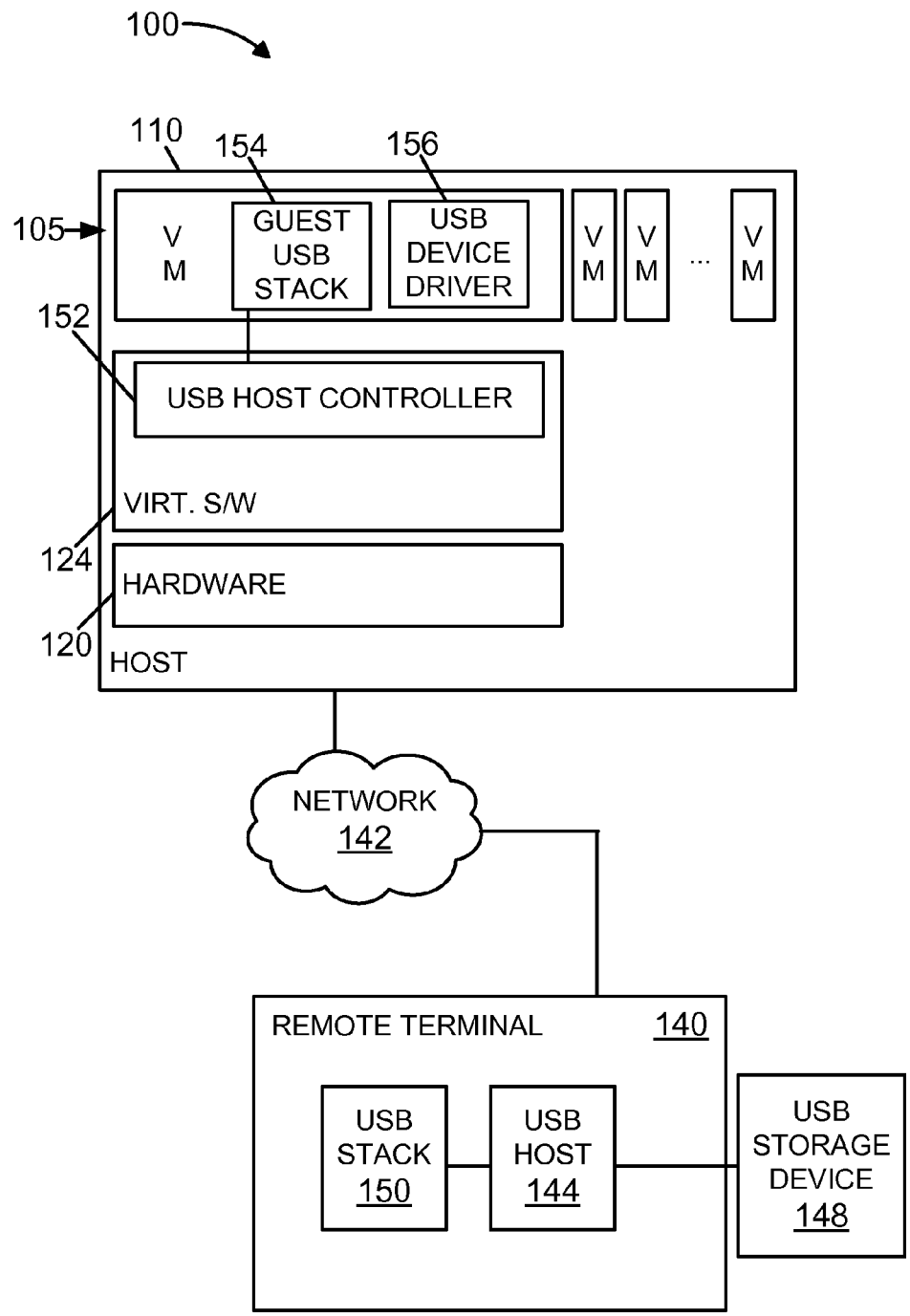
FIG. 1 is a block diagram of an exemplary virtual infrastructure.

FIG. 1 is an exemplary virtual desktop infrastructure (VDI) 100 having a plurality of virtual machines (VMs) 105 on a physical computer system, or host, 110. Each VM 105 provides a "desktop" (not shown) to a user of VMs 105. The desktop is an interactive user environment provided by a guest operating system (not shown) and guest applications (not shown) running within each of VMs 105, and generally includes a graphical display, but may include other outputs, such as audio, indicator lamps, tactile feedback, etc. The desktop also accepts input from the user in the form of device inputs, such as keyboard and mouse inputs. In addition to user input/output, the desktop may send and receive device data, such as input/output for a USB device local to the remote user, or to a local printer, as explained in more detail herein.

Host 110 includes hardware 120, virtualization software 124 running on hardware 120, and one or more VMs 105 executing on hardware 120 by way of virtualization software 124. Virtualization software 124 is therefore logically interposed between, and interfaces with, hardware 120 and VMs 105. Virtualization software 124 may be implemented directly in hardware, e.g., as a system-on-a-chip, firmware, FPGA, etc. Hardware 120 includes at least one processor (not shown), wherein each processor is an execution unit, or "core," on a microprocessor chip. Hardware 120 also includes system memory (not shown), which is general volatile random access memory (RAM), a network interface port (NIC), a storage system (not shown), and other devices. Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each of the VMs 105. Each of VMs 105 may be an abstraction of a physical computer system and may include an operating system (OS) such as Microsoft Windows® and applications, which are referred to as the "guest OS" and "guest applications," respectively, wherein the term "guest" indicates it is a software entity that resides within one of VMs 105.

In the exemplary embodiment, an end user (not shown) connects to, and interacts with, one or more of VMs 105 using remote terminal 140 that is capable of communicating with host 110 via network 142, which may be the Internet, a LAN, a WAN, or any combination thereof. Remote terminal 140 may be or include VDI client software executing on a desktop computer, laptop, mobile device, thin client, server, or other similar device. Remote terminal 140 may be capable of displaying the graphical user interface (GUI) for the guest OS running inside each of VMs 105 for the end user, using a computer display or similar device. Remote terminal 140 is also capable of receiving user input from the end user and transmitting the received user input to the guest OS running inside VMs 105. Remote terminal 140 includes USB host 144 that enables the end user to connect one or more USB storage devices 148 to remote terminal 140.

Remote terminal 140 is configured to interact with USB storage device 148 on behalf of one of VMs 105. More specifically, remote terminal 140 includes USB stack 150 that enables communication between remote terminal 140 and USB storage device 148 via USB host 144. USB stack 150 may provide application programming interfaces (APIs) and/or other interfaces for providing interaction between remote terminal 140 and USB storage device 148. USB stack 150 therefore provides an interface that enables the guest OS running inside one of VMs 105 to communicate with USB storage device 148. USB stack 150 may include a generic USB device driver (not shown). More specifically, virtualization software 124 may provide a virtual USB host controller 152 for use with the guest OS. Each guest OS running inside VMs 105 may provide a guest USB stack 154 and a USB device driver 156. USB device driver 156 communicates with guest USB stack 154, which is in communication with virtual USB host controller 152. Virtual USB host controller 152 may be configured to pass data between USB device driver 156 and USB storage device 148 via network 142 and USB stack 150. Thus, the guest OS running inside one of VMs 105 can communicate with USB storage device 148 physically connected to remote terminal 140.

As an example of a communication between USB device driver 156 and USB storage device 148, a single command may be generated by USB device driver 156. USB device driver 156 passes the command to guest USB stack 154 for processing and forwarding to USB storage device 148. Virtualization software 124 presents virtual USB host controller 152 in a manner consistent with a physical USB host controller, such that, in one embodiment, USB device driver 156 and guest USB stack 154 may be standard software components of commodity operating systems with no modifications. Guest USB stack 154 passes the command to virtual USB host controller 152. Virtual USB host controller 152 is aware of USB storage device 148 on remote terminal 140, and encapsulates or otherwise prepares the command for transmission via network 142. The command is sent via network 142 to remote terminal 140, which receives the command and de-encapsulates the command or otherwise processes the command. Remote terminal 140 passes the command to USB stack 150, which processes and passes the command to USB host 144. Finally, the command is transmitted via a USB bus (not shown) from USB host 144 to USB storage device 148.

In the exemplary embodiment, the USB mass storage class's bulk-only protocol is used for communication between USB device driver 156 and USB storage device 148. This protocol includes three types of requests: a command block wrapper (CBW) having a read, write, or other request to the underlying storage device; a data-in or data-out request used for transferring data to or from the underlying device as appropriate based on the command in the CBW; and a command status wrapper (CSW) having a status returned by the underlying device after executing the command.

Figure 2:
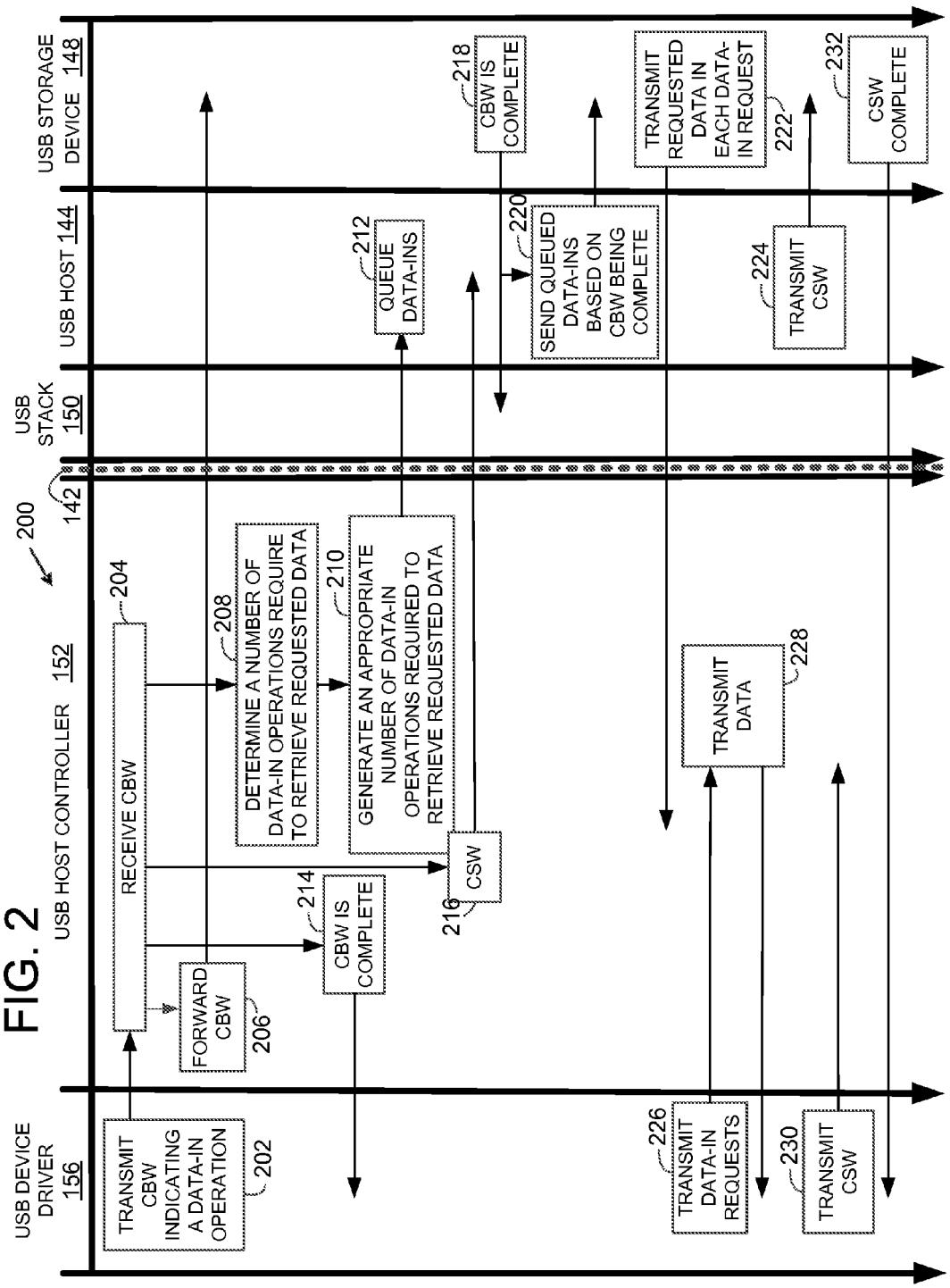
FIG. 2 is a swimlane diagram of an exemplary method for reading data using the infrastructure of FIG. 1.

During a read request, as described in further detail with respect to FIG. 2, a CBW containing a data-in indication is sent from USB device driver 156 to USB storage device 148. USB host controller 152 identifies the data-in indication and determines an appropriate number of data-in requests necessary to retrieve the requested data. USB host controller 152 transmits the appropriate number of data-in requests to USB storage device 148. In other words, rather than waiting for USB device driver 156 to transmit data-in requests, the USB host controller 152 anticipates the data-in requests and transmits them in advance. As USB device driver 156 transmits data-in requests to USB host controller 152, USB host controller 152 may immediately acknowledge the data-in request. USB host controller 152 delivers requested data to USB device driver 156 as it arrives or as it is requested, whichever comes later. Thus, USB host controller 152 may request and store data before USB device driver 156 has requested data. In some embodiments, USB host controller 152 may receive some or all of the requested data before acknowledging the CBW to USB device driver 156.

USB stack 150 receives the data-in requests and, as necessary, places the requests in a queue. As USB stack 150 receives data from USB storage device 148, USB stack 150 transmits the data to USB host controller 152. In some embodiments, the USB stack 150 may itself determine the appropriate number of data-in requests and transmits them to USB storage device 148 in anticipation of receiving the data-in requests from USB device driver 156 and/or host controller 152.

Regardless of whether USB host controller 152 or USB stack 150 generates the anticipatory data-in requests, data is transmitted from USB storage device 148 to USB host controller 152 independently of when USB device driver 156 issues data-in requests. By transmitting anticipatory data-in requests without waiting for USB device driver 156, the requested data can be sent via network 142 without waiting for requests and/or acknowledgements to make a round trip between USB device driver 156 and USB storage device 148. In order to enable out-of-sync communication between USB device driver 156 and USB storage device 148, USB host controller 152 may simulate acknowledgements to commands sent by USB device driver 156.

USB device driver 156 transmits a CSW signaling the completion of the read request to USB storage device 148. USB storage device 148 acknowledges the CSW, and an acknowledgement is sent to from USB storage device 148 to USB device driver 156. Similar to data-in requests, the CSW may be simulated by USB host controller 152 and/or USB stack 150 in anticipation of USB device driver 156 transmitting the CSW.

In some embodiments, USB host controller 152 and/or USB stack 150 may generate and transmit a CBW, data-in requests, and a CSW before USB device driver 156 initiates a read operation (i.e., with a CBW). For example, commonly accessed data can be read from USB storage device 148 and transmitted to USB host controller 152 in anticipation of a read request from USB device driver 156. More specifically, when USB storage device 148 is connected to USB host 144, data associated with the file system of USB storage device 148 may be requested and transmitted to USB host controller 152. For example, as described in further detail with respect to FIG. 4, if the file system uses a File Allocation Table (FAT), further optimization may be achieved by optimizing an initial read of the FAT. Since the FAT is typically read once a storage device (e.g., USB storage device 148) is connected, FAT sectors can be read from USB storage device 148 and pushed directly to USB host controller 152 before being explicitly requested by USB device driver 156. Thus, the FAT may be read and stored by USB host controller 152 before USB device driver 156 requests the FAT. This reduces round trips for reading the FAT for each sector that needs to be read.

Figure 3:
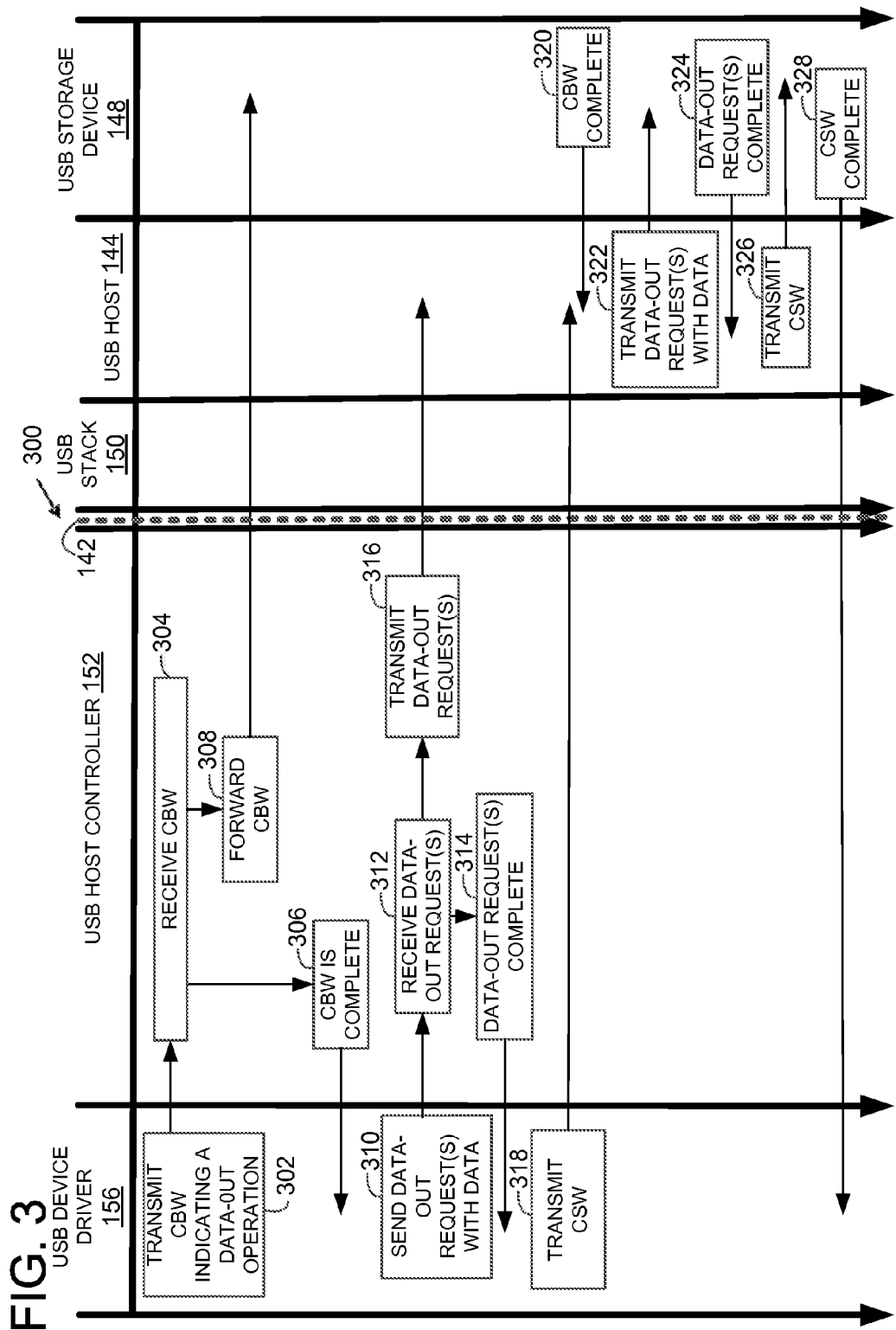
FIG. 3 is a swimlane diagram of an exemplary method for writing data using the infrastructure of FIG. 1.

During a write operation, in the exemplary embodiment and as described in further detail with respect to FIG. 3, a CBW containing a data-out indication is sent from USB device driver 156 to USB storage device 148. USB host controller 152 may immediately acknowledge the CBW without waiting for an acknowledgement from USB storage device 148. USB device driver 156 may transmit one or more data-out requests serially, i.e., by waiting for each data-out request to be acknowledged before sending the next data-out request. In certain embodiments, USB host controller 152 may immediately acknowledge each data-out request such that USB device driver 156 sends data to USB host controller 152 without waiting for an acknowledgement from USB storage device 148. USB host controller 152 transmits the data-out requests to USB storage device 148. After USB device driver 156 transmits the final data-out request, USB device driver 156 transmits a CSW. The CSW is forwarded to and acknowledged by USB storage device 148. Accordingly, the data-out requests may be sent asynchronously to USB storage device 148.

Thus, USB read operations over a high-latency connection are optimized by sending one or more anticipatory data-in requests. By sending an appropriate number of data-in requests without waiting for data to be returned, round-trip delays are at least partially obviated. In USB write operations, data-out requests are immediately acknowledged such that data can be transmitted without waiting for high-latency acknowledgements.

FIG. 2 shows a flowchart 200 of an exemplary method for reading data using infrastructure 100 shown in FIG. 1. This method may be embodied within a plurality of computer-executable instructions stored in one or more memories, such as one or more computer-readable storage mediums. The instructions are executed by one or more processors to perform the functions described herein.

In operation 202, USB device driver 156 initiates a transmission of a CBW to USB storage device 148 indicating a data-in operation. In operation 204, USB host controller 152 receives the transmission of the CBW from USB device driver 156, and, in operation 208, USB host controller 152 determines, based on the CBW or otherwise, an appropriate number of data-in operations needed to retrieve the requested data. In operation 210, USB host controller 152 generates an appropriate number of data-in operations needed to retrieve the requested data, which are queued in operation 212 by or for USB host 144. After the data-in operations are received by USB host 144, USB host controller 152 sends CSW to be queued in USB host 144 in operation 216. Also, in response to receiving the CBW in operation 204, USB host controller 152 forwards the CBW to USB storage device 148 in operation 206 and an indication that the CBW is completed is sent from USB host controller 152 to USB device driver 156 in operation 214. In various embodiments, operations 210, 214, and 216, may be immediately carried out upon receipt of the CBW in operation 204, at the same time (i.e., concurrently, or in close proximity in time such preceding or following one another), without waiting for acknowledgement either from USB storage device 148 of receipt of the CBW or from USB host 144.

USB storage device 148, in operation 218, transmits an acknowledgement that the CBW was received and completed. In one embodiment, the acknowledgment sent by USB storage device 148 to USB stack 150 and not across network 142, except in a case of potential errors. In operation 220, USB host 144 transmits the queued data-in operations to USB storage device 148 once the CBW is identified as being complete in operation 218. Operations 208, 210, and 212 may occur before USB storage device 148 responds in operation 218 as the acknowledgement of the CBW is not necessary to determine the data-in indication and transmit data-in requests to USB Host 144. In operation 222, USB storage device 148 transmits the data requested in each data-in request, and in operation 224, the queued CSW is transmitted from USB host 144 to USB storage device 148.

USB device driver 156, in operation 226, transmits data-in requests to USB host controller 152. Operation 226 may be executed before or after either operation 220 or 222. In other words, data-in requests are sent to USB storage device 148 independent of when USB device driver 156 transmits data-in requests to USB host controller 152. As there may be more than one data-in request, some or all data-in requests transmitted by USB host controller 152 may be transmitted before the data-in requests transmitted by USB device driver 156. In operation 228, USB host controller 152 transmits data to USB device driver 156 in response to data-in requests transmitted in operation 226. As USB device driver 156 may request data before USB host controller 152 has received the data, operation 228 may not execute until USB host controller 152 has received the data.

In operation 230, USB device driver 156 transmits a CSW to USB host controller 152. In operation 232, USB storage device 148 transmits an acknowledgement that the CSW was received and completed to USB device driver 156. In some embodiments, USB host controller 152 requests a CSW from USB storage device 148 before the USB device driver 156 sends a CSW request to USB host controller 152. In that case, the USB host controller 152 stores the CSW received from storage device 148 until the CSW request is received at USB host controller 152 from USB device driver 156.

FIG. 3 is a flowchart 100 of an exemplary method for writing data using the infrastructure 100 shown in FIG. 1. Method 300 may be embodied within a plurality of computer-executable instructions stored in one or more memories, such as one or more computer-readable storage mediums. The instructions are executed by one or more processors to perform the functions described herein.

In operation 302, USB device driver 156 initiates a transmission of a CBW to USB host 144 indicating a data-out operation. In operation 304, USB host controller 152 receives the CBW and sends an identification to USB device driver 156 that the CBW is complete in operation 306. In operation 308, USB host controller 152 forwards the CBW to USB storage device 148. In one embodiment, operations 306 and 308 are carried out at the same time upon receipt of the CBW in operation 304. In operation 310, USB device driver 156 sends one or more data-out requests with data, and in response to USB host controller 152 receiving the data-out requests in operation 312, USB host controller 152 acknowledges the data-out request being sent in operation 314. By acknowledging the data-out request in operation 314, USB device driver 156 may continue to send data (i.e., may send additional data-out requests) to USB host controller 152 regardless of whether USB storage device 148 has sent an acknowledgement that the CBW, or prior data out requests were received and completed. In operation 316, in response to receiving the data-out requests, USB host controller 152 transmits data-out requests with data to USB host 144 where it is queued. As there may be more than one data-out request, some or all data-out requests transmitted by USB device driver 156 may be transmitted before the data-out requests are transmitted by USB host controller 152. In operation 318, USB device driver 156 transmits a CSW to USB host 144 where it is also queued.

In operation 320, USB storage device 148 transmits a CBW complete message to USB host 144, and in response thereto, USB host 144 transmits the queued data-out requests to USB storage device 148 in operation 322. As USB host controller 152 may have already acknowledged a data-out request to USB device driver 156, the acknowledgement from USB storage device 148 may be ignored or discarded. In operation 324, USB storage device 148 transmits an acknowledgement that the data-out request is complete to USB host 144. In operation 326, USB host 144 transmits the queued CSW to USB storage device 148, and in operation 328, USB storage device 148 sends an indication that CSW is complete to USB device driver 156.

Figure 4:
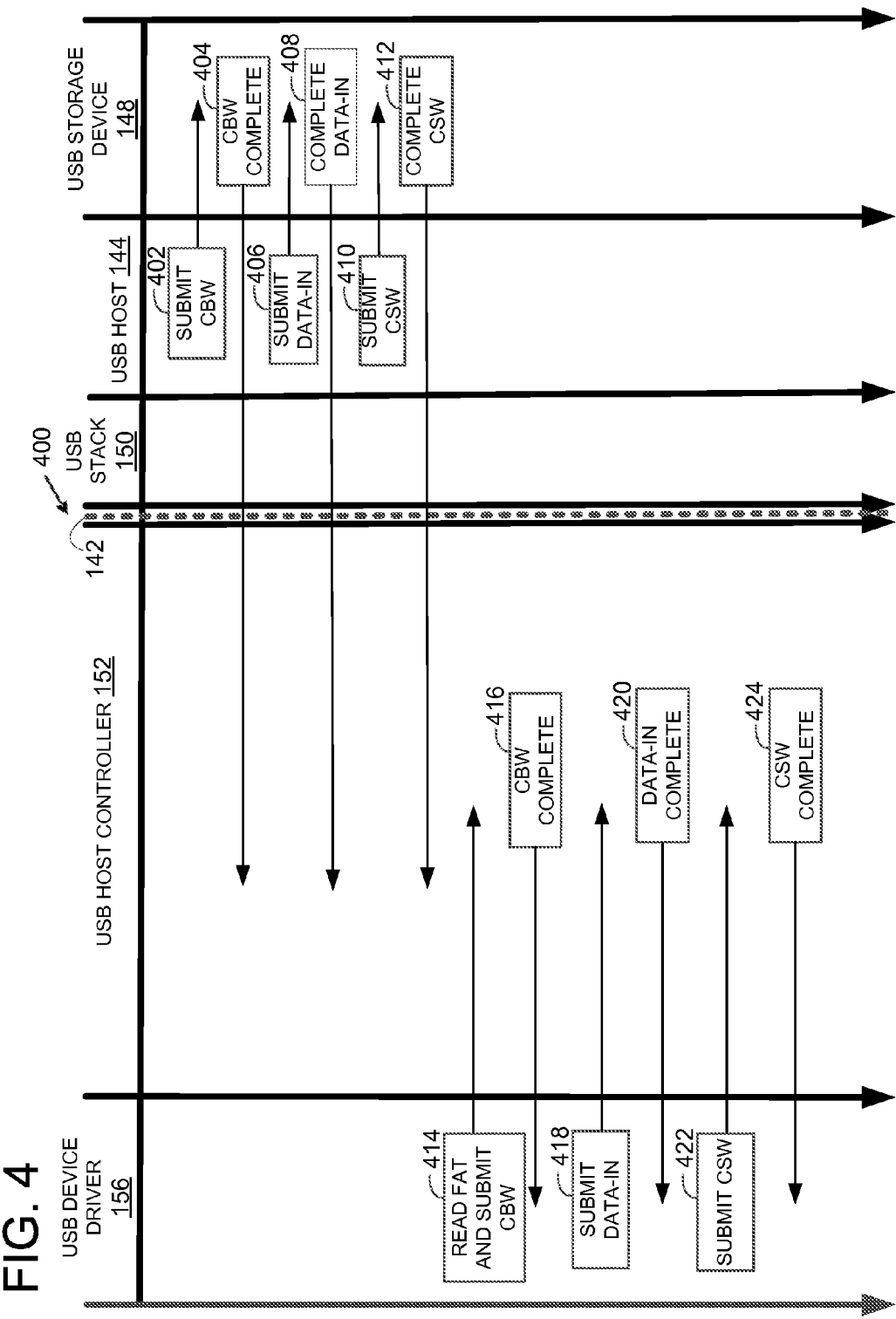
FIG. 4 is a swimlane diagram of an exemplary method for using a File Allocation Table (FAT) with the infrastructure of FIG. 1.

FIG. 4 is a flowchart 400 of an exemplary method of using a FAT with the infrastructure 100 shown in FIG. 1. This method may be embodied within a plurality of computer-executable instructions stored in one or more memories, such as one or more computer-readable storage mediums. The instructions may be executed by one or more processors to perform the functions described herein.

In one embodiment, FAT sectors can be read from USB storage device 148 and pushed (or alternatively, pulled) directly to USB device driver 156 before being explicitly requested by USB device driver 156. For example, in operation 402, USB host 144 reads the FAT and submits a CBW to USB storage device 148 once USB storage device 148 is connected. In operation 404, USB storage device 148 sends an indication that the CBW is completed. In one embodiment, the indication from USB storage device 148 that the CBW is completed is sent to USB host controller 152. However, once USB host 144 receives the indication that the CBW is completed, USB host 144 transmits data-in requests to USB storage device 148 in operation 406. In operation 408, USB storage device 148 transmits the requested data. In one embodiment, the data from USB storage device 148 is sent to USB host controller 152. However, once USB host 144 receives the data, USB host 144 transmits, in operation 410, a CSW to USB storage device 148. In operation 412, USB storage device 148 transmits an acknowledgement that the CSW was received and completed. As a result of the above operations, one or more of the completed CBW, data, and completed CSW may be received by USB host controller 152 at the host prior to USB host controller 152 receiving an expected request to read the FAT or a request to submit the CBW from USB storage driver 156. Therefore, one or more of the completed CBW, data, and completed CSW may be queued within USB host controller 152.

In operation 414, a request to read the FAT and submit the CBW is sent from USB device driver 156 to USB host controller 152. As explained above, USB host 144 previously read the FAT and submitted the CBW once USB storage device 148 was connected. In response, USB storage device 148 submitted an indication that the CBW is completed to USB host controller 152. As such, once USB host controller 152 receives the CBW from USB device driver 156, USB host controller 152 can immediately respond that the CBW is completed in operation 416. In operation 418, USB device driver 156 transmits data-in requests to USB host controller 152. In response to receiving the data-in requests from USB device driver 156, USB host controller 152 transmits the queued data to USB device driver 156 in operation 420. In operation 422, USB device driver 156 transmits a CSW to USB host controller 152. In operation 424, USB host controller 152 transmits an acknowledgement that the CSW was received and completed to USB device driver 156. As explained above, USB host controller 152 may have already received the CSW from USB storage device 148 before USB device driver 156 sends a CSW. As such, USB host controller 152 stores the CSW until USB device driver 156 sends the CSW. FAT data that is expected to be requested can be sent to USB host controller 152 via network 142 without waiting for requests and/or acknowledgements to make high-latency round trip between USB device driver 156 and USB storage device 148.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A virtual host comprising:
a virtual machine running a guest operating system (OS); and
a virtual universal serial bus (USB) host associated with the virtual machine and configured to:
communicate with a USB storage device that is connected to a remote terminal; and
transmit a data-in request to the USB storage device before the guest OS generates the data-in request.

2. The virtual host of claim 1, wherein the virtual USB host is further configured to determine a number of data-in requests.

3. The virtual host of claim 2, wherein the virtual USB host is further configured to determine the number of data-in requests based on a command block wrapper received from the guest OS.

4. The virtual host of claim 2, wherein the virtual USB host is further configured to transmit one or more data-in requests equal to the determined number of data-in requests.

5. The virtual host of claim 1, wherein the virtual USB host is further configured to initiate a data read operation before the guest OS initiates the data read operation.

6. The virtual host of claim 5, wherein the USB storage device includes a file allocation table and the virtual USB host is further configured to retrieve the file allocation table before the guest OS requests the file allocation table.

7. The virtual host of claim 1, wherein the virtual USB host stores data received from the USB storage device until the guest OS requests the data received from the USB storage device.

8. The virtual host of claim 1, wherein the virtual USB host is further configured to:
request a command status wrapper (CSW) from the USB storage device;
queue the CSW received from the USB storage device;
receive, from the guest OS, a request for the CSW from the USB storage device; and
transmit the queued CSW to the guest OS upon receiving the request for the CSW from the guest OS.

9. The virtual host of claim 1, wherein the remote terminal is connected to the virtual host via a network.

10. A method of reading data from a universal serial bus (USB) storage device, the method comprising:
transmitting a command block wrapper (CBW) to the USB storage device;
transmitting one or more data-in requests before an operating system generates the one or more data-in requests;
receiving data from the one or more data-in requests; and
transmitting a command status wrapper (CSW) to the USB storage device.

11. The method of claim 10, further comprising determining a number of data-in requests.

12. The method of claim 11, wherein determining a number of data-in requests comprises determining a number of data-in requests based on the CBW.

13. The method of claim 10, wherein transmitting a CBW comprises transmitting a CBW before an operating system generates the CBW.

14. The method of claim 13, wherein transmitting a CBW comprises transmitting a CBW related to a file allocation table of the USB storage device.

15. The method of claim 10, further comprising storing data received from the USB storage device until an operating system requests the data received from the USB storage device.

16. A method of writing data to a universal serial bus (USB) storage device, the method comprising:
transmitting a command block wrapper (CBW) to the USB storage device;
receiving one or more data-out requests;
acknowledging the one or more data-out requests before the USB storage device has received the one or more data-out requests;
queuing, by a virtual USB host, the one or more data-out requests such that each data-out request is transmitted to the USB storage device after a previous data-out request is completed;
transmitting the one or more data-out request to the USB storage device; and
transmitting a command status wrapper (CSW) to the USB storage device.

17. The method of claim 16, further comprising discarding an acknowledgement received from the USB storage device associated with the one or more data-out request.

18. One or more non-transitory computer-readable medium comprising computer executable instructions that when executed by a processor, cause the processor to:
transmit a command block wrapper (CBW) to a USB storage device;
transmit one or more data-in requests before an operating system generates the one or more data-in requests;
receive data from the one or more data-in requests; and
transmit a command status wrapper (CSW) to the USB storage device.

19. A virtual host comprising:
a virtual machine running a guest operating system (OS);
a virtual universal serial bus (USB) storage device; and
a virtual USB host configure to:
transmit a command block wrapper (CBW) to the USB storage device;
receive one or more data-out request;
acknowledge the one or more data-out request before the USB storage device has received the data-out request;
queue the one or more data-out requests such that each data-out request is transmitted to the USB storage device after a previous data-out request is completed;
transmit the one or more data-out request to the USB storage device; and
transmit a command status wrapper (CSW) to the USB storage device.

20. One or more non-transitory computer-readable medium comprising computer executable instructions that when executed by a processor, cause the processor to:
transmit a command block wrapper (CBW) to a USB storage device;
receiving one or more data-out request;
acknowledge the one or more data-out request before the USB storage device has received the data-out request;
queue, by a virtual USB host, the one or more data-out requests such that each data-out request is transmitted to the USB storage device after a previous data-out request is completed;
transmit the one or more data-out request to the USB storage device; and
transmit a command status wrapper (CSW) to the USB storage device.

* * * * *